United States Patent [19]

Brenner

[11] 4,229,337

[45] Oct. 21, 1980

[54] AROMATIC AMIDE PLASTICIZER FOR IONIC POLYMERS

[75] Inventor: Douglas Brenner, Livingston, N.J.

[73] Assignee: Exxon Research & Engineering Co., Florham Park, N.J.

[21] Appl. No.: 947,431

[22] Filed: Oct. 2, 1978

[51] Int. Cl. .................................................. C08k 5/20
[52] U.S. Cl. ............................................. 260/32.6 A
[58] Field of Search ................. 260/32.6 A, 45.9 NC; 526/6

[56] References Cited

U.S. PATENT DOCUMENTS

| | | | |
|---|---|---|---|
| 2,356,128 | 8/1944 | Thomas | 525/347 |
| 2,415,356 | 2/1947 | Kellog | 260/32.6 A |
| 3,280,082 | 10/1966 | Natta | 525/354 |
| 3,642,728 | 2/1972 | Canter | 260/79.3 R |
| 3,836,511 | 9/1974 | O'Farrell | 525/341 |
| 3,847,854 | 11/1974 | Canter | 260/23.7 M |
| 3,870,841 | 3/1975 | Makowski | 260/32.6 A |
| 4,118,362 | 10/1978 | Makowski | 260/32.6 A |

FOREIGN PATENT DOCUMENTS 1386600 12/1964 France .

*Primary Examiner*—Paul R. Michl
*Attorney, Agent, or Firm*—Richard E. Nanfeldt

[57] ABSTRACT

This invention relates to improved elastomeric compositions of metal and ammonium neutralized sulfonated elastomeric polymers which are preferentially plasticized with a naphthalene amide at a minimum critical concentration level of at least 8 parts by weight per 100 parts of the metal neutralized elastomeric polymer, wherein the composition has an improved balance of physical and rheological properties, especially at elevated use temperatures. These compositions can be readily processed due to their superior rheological properties on conventional plastic fabrication equipment.

18 Claims, No Drawings

AROMATIC AMIDE PLASTICIZER FOR IONIC POLYMERS

BACKGROUND OF THE INVENTION

1. Field of the Invention

This invention relates to improved elastomeric compositions of metal and ammonium neutralized sulfonated elastomeric polymers which are preferentially plasticized with a naphthalene amide at a minimum critical concentration level of at least 8 parts by weight per 100 parts of the metal neutralized elastomeric polymer, wherein the composition has an improved balance of physical and rheological properties, especially at elevated use temperatures. These compositions can be readily processed due to their superior rheological properties on conventional plastic fabrication equipment.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO₃H groups of the sulfonated elastomer can be readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a processable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of U.S. Pat. No. 3,642,728 are readily usable in a certain number of limited applications, they are not as readily adaptable for the manufacture of an injection moldable elastomeric article such as footwear as are the improved compositions of the present invention, wherein both improved physical and rheological properties are realized.

U.S. Pat. No. 3,836,511, herein incorporated by reference teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by the process of U.S. Pat. No. 3,870,841 are not as suitable for the manufacture of high performance elastomeric articles such as footwear formed by an injection molding process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debye, and must be a liquid at the desired processing temperature of the neutralized sulfonated elastomeric polymer.

The concentrations of the non-volatile plasticizers are limited to an upper concentration of 6-7 parts by weight because with the metal neutralized sulfonated elastomers of this invention, there would be an adverse plasticization of the polymeric backbone. This invention fails to teach, imply or infer the use of an aromatic organic amide as a preferential plasticizer at high concentrations; nor does it recognize that only amides of certain critically selected structures give a particularly advantageous balance of rheological and physical properties. The inventive concept of the present invention clearly teaches the use of selected naphthalene amides as preferential plasticizers at a minimum concentration level of at least about 8 parts by weight thereby achieving not only improvements in rheological properties but also improvements in physical properties. Copending U.S. Ser. No. 855,554 to H. S. Makowski and D. Brenner is directed to the plasticization of sulfonated elastomeric compositions with aliphatic organic amides. In fact, this application implies that the amides as specified in the instant application would not be suitable as plasticizers for sulfonated elastomers. However, it has surprisingly been found that certain critically selected naphthalene amides give a superior balance of rheological and physical properties.

SUMMARY OF THE INVENTION

The present invention relates to improved compositions of metal neutralized sulfonated elastomeric terpolymers being preferentially plasticized with about 8 to about 75 parts by weight of a naphthalene amide based on 100 parts of the neutralized sulfonated elastomeric polymers, more preferably about 9 to about 40 and most preferably about 10 to about 30. These compositions have an improved balance of high temperature tensile properties and rheological properties which was previously unattainable by the teachings of the prior art. The compositions of the present invention are readily processed due to their superior rheological properties on conventional plastic fabrication equipment into high performance elastomeric articles such as garden hose or elastomeric footwear.

Accordingly, the present instant invention teaches unique and novel compositions of metal and ammonium neutralized sulfonated elastomeric polymer being preferentially plasticized with naphthalene amides thereby providing high performance elastomeric articles which can be formed on conventional plastic fabricating equipment, wherein the compositions can be optionally modified with fillers, extender oils or polyolefinic thermoplastics and mixtures thereof.

GENERAL DESCRIPTION

This present invention relates to unique and novel elastomeric compositions of a metal or ammonium neutralized sulfonated elastomeric polymer, being preferentially plasticized with an aromatic naphthalene organic amide wherein the compositions exhibit not only a substantial improvement in flow properties but unexpected and substantial improvements in high temperature tensile properties thereby providing high performance elastomeric articles. Thus, by the addition of high concentrations of specific naphthalene amides essentially intractable sulfonated polymer can be made to process readily in conventional molding or extrusion operations.

The metal and ammonium neutralized sulfonated elastomeric polymers of this present instant invention are derived from unsaturated polymers which include low unsaturated elastomeric polymers such as Butyl rubber and EPDM terpolymers.

The expression "Butyl rubber" as employed in the specification and claims is intended to include copolymers made from a polymerization reaction mixture having therein from 70 to 99.5% by weight of an isoolefin which has about 4 to about 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin; preferably about 0.5 to about 6%; more preferably about 1 to about 4%, e.g. 2%. Illustrative of such a Butyl rubber is Exxon Butyl 365 (Exxon Chemical Co.), having a mole percent unsaturation of about 2.0% and a Mooney viscosity (ML, 1+8, 212° F.) of about 40-50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 45 to about 75 wt. % ethylene, e.g. 50 wt. % and about 2.6 to about 8.0 wt. % diene monomer, e.g. 5.0 wt. %. The diene monomer is preferably a nonconjugated diene. Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene. A typical EPDM is Vistalon 2504 (Exxon Chemical Co.) a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000. Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000. Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene. The EPDM terpolymers of this invention have a number average molecular weight $\overline{M}n$ as measured by GPC of about 10,000 to about 200,000; more preferably of about 15,000 to about 100,000; most preferably of about 20,000 to about 60,000. The Mooney viscosity (ML, 1+8, 212° F.) of the EPDM terpolymer is about 5 to about 60, more preferably about 10 to about 50, and most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The polymer to be sulfonated is dissolved in a nonreactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −10° C. to about 100° C. for a period of time of about 1 to about 60 minutes, most preferably at room temperature for about 5 to about 45 minutes, and most preferably about 15 to about 30. Typical sulfonating agents are described in U.S. Pat Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium or preformed in a chlorinated aliphatic or aromatic hydrocarbon or in the absence of solvent.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, an aromatic hydroxyl compound, such as phenol, a cycloaliphatic alcohol such as a cyclohexanol, or water. The sulfonated elastomeric polymer has about 10 to about 60 meq. sulfonate groups per 100 grams of sulfonated polymer, more preferably about 15 to about 50, and most preferably about 20 to about 40. The meq. of sulfonate groups/100 grams of sulfonated polymer is determined by both titration of the polymeric sulfonate and Dietert Sulfur analysis. In the titration of the sulfonated polymer, the polymer is dissolved in a solvent consisting of 95 parts of toluene and 5 parts of methanol at a concentration level of 50 grams per liter of solvent. The sulfonated polymer is titrated with ethanolic sodium hydroxide to an Alizarin-Thymolphthalein endpoint.

Neutralization of the sulfonated elastomeric polymer is done, for example, by the addition of a solution of neutralizing agent such as a metal acetate or ammonium bases or amines such as ammonium acetate to the sulfonated elastomeric polymer dissolved in the mixture of the aliphatic alcohol and non-reactive solvent. The neutralizing agent has an ammonium ion or a metal ion selected from the group consisting of iron, antimony, lead and Groups IA, IB, IIA and IIB of the Periodic Table of Elements. The metal acetate is dissolved in a binary solvent system consisting of water and/or aliphatic alcohol. Typical but non-limiting metal acetates are sodium acetate, ammonium acetate, barium acetate, magnesium acetate, aluminum acetate, potassium acetate, lead acetate, and zinc acetate, wherein zinc acetate is preferred. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the sulfonated elastomeric polymer to effect neutralization of the sulfonate groups. It is preferable to neutralize at least 95% of the sulfonate groups, more preferably about 98%, most preferably 100%. Metal oxides and hydroxides such as ZnO and Mg(OH)$_2$ can be employed to effect the neutralization of the SO$_3$H groups.

The resultant neutralized sulfonated terpolymer has a melt viscosity which is dependent upon the molecular weight of the base polymer, the level of sulfonation, and the associated cation. An EPDM with an original Mooney viscosity (ML, 1+8, 212° F.) of about 55, containing about 40 meq. sulfonate/100 g of sulfonated EPDM and possessing cations such as mercury, magnesium, calcium, cobalt, lithium, barium, sodium and the like may disintegrate in a capillary rheometer at 200° C. at a shear rate of 0.73 sec$^{-1}$ and will possess an apparent viscosity in excess of $5 \times 10^6$ poise. An EPDM with an original Mooney viscosity (ML, 1+8, 212° F.) of about 20, containing about 30 meq. sulfonate/100 g of sulfonated EPDM, and possessing cations such as zinc, lead, and ammonium possesses an apparent viscosity of from about $10^6$ to about $3.5 \times 10^6$ poise at a shear rate of 0.73 sec$^{-1}$ at 200° C. Lower sulfonate contents with amine salts result in apparent viscosities below $1 \times 10^6$ poise under the same testing conditions.

On the other hand the physical properties of the unplasticized sulfonated and neutralized elastomers improve with increasing sulfonate content. Further metallic cations provide better physical properties than the ammonium or amine cations. Good development of physical properties usually starts to occur when about 20 meq. sulfonate/100 polymer are present, and the physical properties obtained at 30 meq. sulfonate/100 polymer and higher are preferred. However, even at these higher levels of sulfonate the unplasticized neutralized sulfonated elastomers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed in plasticizers that would give the ionomers lower melt viscosities at processing temperatures and thereby permit melt fabrication. However, many of the materials listed are relatively poor flow improvers. This patent also failed to recognize that not only is the functional group of the plasticizer critical in determining its effectiveness but also that the radical or substituent carrying the functional group also is very important.

Further U.S. Pat. No. 3,847,854 teaches that the effective flow improvers have an adverse effect on physical properties and therefore cautions against the use of more than 6-7 wt. % of a non-volatile plasticizer above which improvement in melt flow was taught to be associated with a consequent loss in physical properties.

It has been found that among a large number of non-volatile functional organic compounds that certain critically selected naphthalene amides, when added at high concentration levels to a neutralized sulfonated elastomer, result in markedly improved flow properties while maintaining substantial physical properties for the sulfonated elastomeric compositions. Contrary to the teachings of U.S. Pat. No. 3,847,854 at concentrations beyond 6-7 parts by weight of amide per 100 parts of polymer additional quantities of these select amides can exert beneficial tensile property improvements at use temperatures in addition to improvements in melt flow at processing temperatures. In fact, optimal balances of tensile properties and rheological properties generally occur at amide concentrations of about 10 to about 30 parts by weight of amide.

Useful naphthalene amides for the practice of the instant invention are represented by the formulas selected from the group consisting of:

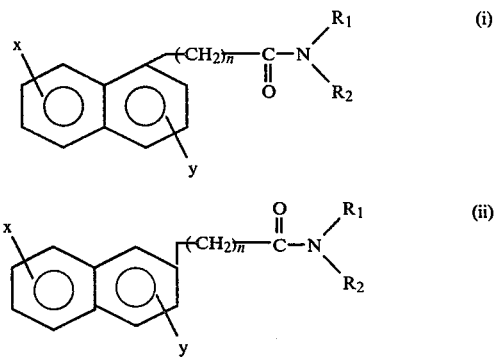

or wherein n equals 0, 1, 2, 3, or 4, more preferably 0, 1, or 2, most preferably 0 or 1; $R_1$ and $R_2$ are independently selected from the group consisting of hydrogen, and $C_1$ to $C_4$ straight and branched chain alkyl groups, more preferably hydrogen and $C_1$ to $C_2$ alkyl groups, most preferably hydrogen; wherein x and y are independently selected from the group consisting of hydrogen, $C_1$ to $C_4$ straight and branched chain alkyl groups, halogen and amine groups, more preferably hydrogen and $C_1$ to $C_2$ alkyl groups, most preferably hydrogen. A typical preferred example of a naphthalene amide of the instant invention to naphthene acetamide.

In order to achieve a suitable balance of good melt flow and enhanced physical properties it is important to incorporate the aromatic amide into the neutralized sulfonated elastomer at about 8 to about 75 parts by weight per hundred of the sulfonated polymer, more preferably at about 9 to about 40, and most preferably at about 10 to about 30.

Improvements in flow and physical properties by the addition of high concentration of a selected aromatic amide to a sulfonated elastomer have been found to be obtainable with a plurality of cations. Of the many useful cations Zn, Pb, Ba, Mg, K, and Na are preferred. Most preferred are the Zn and Na sulfonates which provide naphthalene amide plasticized gums with exceptional physical properties and ready melt processability.

The critically selected aromatic amides can be incorporated into the unplasticized gums in a number of ways. A convenient method is the addition of the amide to the cement of the sulfonated and neutralized polymer prior to its isolation during the manufacturing process. The resultant plasticized polymer still has sufficiently high viscosity and integrity that it can be easily and conveniently dried in a tumble dryer or fluid dryer with hot air at for example 100° C. Yet the plasticized polymer can be made to possess sufficiently low viscosity so that it may be dewatered and dried in a dewatering extruder.

Aromatic amides can also be added to the gums through the solution of already isolated and dried unplasticized gums and the addition of the amide to this solution. The resultant blend is isolated in the usual manner. Alternatively, the gum and the amide can be mixed in bulk form in high intensity high shear mixers such as Banbury mixers and Farrell continuous mixers.

A number of critically selected additives can be optionally added to the blend composition for modification of the physical and rheological properties of the blend compositions.

The fillers employed in the blend compositions of the present invention are selected from talcs, ground calcium carbonate, water precipitated calcium carbonate, or delaminated, calcined or hydrated clays and mixtures thereof. These fillers are incorporated into the blend composition at about 25 to about 350 parts by weight per 100 parts of neutralized sulfonated polymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil /100 grams of filler | Specific gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| magnesium silicate | Mistron Vapor | 60–70 | 2.75 | 2 | 9.0–7.5 |

The preferred oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 25 to about 200 parts by weight per 100 parts of the neutralized sulfonated polymer; more preferably at about 25 to about 150, and most preferably at about 50 to about 150.

TABLE II

| Type Oil | Oil Code | Viscosity ssu | $M_n$ | % Polars | % Aromatic | % Saturates |
|---|---|---|---|---|---|---|
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other additives can be incorporated into the elastomeric blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts by weight per 100 parts of the neutralized sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts by weight per 100 parts of the neutralized sulfonated polymer, more preferably about 0 to about 15. Alternatively, a Rutile or Anatese titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 10 parts by weight per 100 parts of the neutralized sulfonated elastomeric polymer, wherein the metal ion of the metallic hydroxide is selected from Group II-A of the Periodic Table of Elements such as barium, calcium or magnesium.

A lubricant can be employed in the blend composition at a concentration level of about 0 to about 20 parts by weight per 100 parts of the neutralized sulfonated elastomeric polymers, and more preferably about 0 to about 15. The lubricants of the present instant invention are non-polar paraffinic hydrocarbon waxes having a softening point of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of silica, carbon black, or calcium silicate and mixtures therein. These reinforcing agents are generally characterized as having particle sizes below 0.1 microns and oil absorption above about 100. These reinforcing fillers are incorporated in the blend composition at about 0 to 50 parts by weight per 100 parts of the neutralized sulfonated polymer, more preferably 0 to 25.

DETAILED DESCRIPTION

The advantage of both the rheological and physical properties of the blend compositions of the present invention can be more readily appreciated by reference to the following examples and tables. Unless otherwise specified, all measurements are in parts per hundred by weight.

EXAMPLE 1

PREPARATION OF A ZINC NEUTRALIZED, LIGHTLY SULFONATED ELASTOMER

An EPDM was used as the backbone elastomeric polymer. It had a composition of about 52 wt. % ethylene, 43 wt. % propylene and 5 wt. % of 5-ethylidene-2-norbornene, and it had a Mooney viscosity ML at 212° F. (1+8 min) of about 20. This material was formed by the thermal breakdown of a 40 Mooney EPDM Vistalon 2504 which is manufactured by Exxon Chemical Company. This base polymer was lightly sulfonated using acetyl sulfate in accordance with the method disclosed in U.S. Pat. No. 3,836,511, to a sulfonate level of about 32 meq. sulfonate groups per 100 g of base polymer. This lightly sulfonated elastomer was neutralized in solution by the addition of excess zinc acetate at a concentration of about 60 meq. per 100 g of polymer. This material was steam stripped and then dried in a fluidized bed hot air drier. This material was utilized for the preparation of some of the samples which are described in the following examples. This zinc neutralized lightly sulfonated EPDM was quite tough even at elevated temperatures, and it was too intractable to be frabricated by rapid polymer processing techniques such as extrusion or injection molding.

EXAMPLE 2

MELT INCORPORATION OF A NAPHTHALENE AMIDE INTO A NEUTRALIZED LIGHTLY SULFONATED ELASTOMER

The naphthalene amide (1-naphthaleneacetamide) was added to the non-plasticized zinc neutralized sulfonated elastomer prepared in Example 1 in a Brabender plasticorder having a 60 ml. mixing head with Banbury mixers. The mixing was done at 50 RPM and about 160° C. Many of the plasticized mixes used in the following examples were prepared at a range of different concentrations using the following procedure. The non-plasticized gum was added to the mixing head in the form of a coarse crumb. It was packed in to fill up the mixing head, and then the first level of the additive was added. About 3 minutes after adding the plasticizer the material was mixing well and the mix was well homogenized. At this point a small sample of about 6 g was removed from the melt through the gate of the mixing head. Then the second level of the plasticizer was added and additional nonplasticized sulfonated EPDM gum was added to fill the mixing head. This material was mixed until it was mixing well and the torque reading had stabilized; usually this took about 3 minutes, and then a second sample of about 6 g was removed from the mixing head. Calculations of wt. % additive for these samples took into consideration the sample previously removed as well as the additional additive and nonplasticized gum added after the earlier sample was taken. After the second sample was removed and weighed, the third level of the additive was added and also additional nonplasticized gum to adequately fill the Brabender mixing head so that the gate was just barely bouncing. The amount of nonplasticized gum needed was determined by running the mixing head for a short time (roughly 15 seconds) and observing whether the gate was bouncing slightly—indicating a filled mixing head. After about 3 minutes mixing at this concentration the mixing torque had stabilized, and the sample was well homogenized. This procedure was continued until samples had been made at all of the desired concentrations. After the mixing at the last concentration was completed the full sample was removed from the mixing head and sheeted out with a single pass through a two roll mill having a roll separation of about 0.04 inches.

EXAMPLE 3

MELT FLOW AND PHYSICAL PROPERTIES AT VARIOUS TEMPERATURES OF A NEUTRALIZED SULFONATED EPDM PLASTICIZED WITH 1-NAPHTHALENEACETAMIDE

An outstanding characteristic of naphthalene amide plasticizers is the exceptionally high tensile strength at high use temperatures which they impart to the sulfonated elastomer. This example presents the tensile properties of a zinc neutralized sulfonated EPDM which was plasticized with a high concentration of 1-naphthaleneacetamide.

Samples of the zinc neutralized sulfonated EPDM prepared in Example 1 were plasticized with various levels of 1-naphthaleneacetamide in the Brabender mixing head using the procedure described in Example 2. Three samples of this naphthalene amide were prepared at concentrations of 2.4, 5.7, and 17 weight percent. Excellent mixing and good uniformity of the material was achieved at all concentrations.

Melt flow rates for these materials were determined at 190° C. which is in the range of typical processing temperatures for lightly sulfonated EPDM. The melt index instrument specified in ASTM 1238-70 was used, with the standard capillary. The weight of the probe plus the added weight was 12.5 kilograms. Flow rates were measured electronically as probe displacement per minute, and these results were converted to grams per 10 minutes using a conversion factor.

The melt flow rates for these lightly sulfonated EPDM samples plasticized with 1-naphthaleneacetamide are shown in Table III. It is seen that 1-naphthaleneacetamide is an excellent melt flow promoter; as the concentration of additive is increased, the melt flow rate of the plasticized gum increases dramatically. At 17 wt. % of the 1-naphthaleneacetamide the melt flow rate has increased by about a factor of 200, converting the intractable nonplasticized gum into an easily processable melt at 190° C. In particular, note the substantial increase of more than a factor of 5 in melt flow rate in going from about 6 to 17 wt. % of additive, this shows that there is a considerable advantage in processability in going to plasticizer concentrations of well above 6 percent.

TABLE III

Melt Flow Fates of a Zinc Neutralized Sulfonated EPDM Gum Plasticized with 1-Naphthaleneacetamide

| Concentration of Napthaleneacetamide (wt. %) | Melt Flow Rate 190°C., 250 psi (g/10 min.) |
|---|---|
| 0.0 | 0.007 |
| 2.4 | 0.052 |
| 5.7 | 0.23 |
| 17. | 1.3 |

To determine whether satisfactory physical properties were retained by the sample containing 17 wt. % of the 1-naphthaleneacetamide which had such outstanding rheology, tensile measurements were made at several different temperatures. Tensile test pads were made from the 17 wt. % sample by compression molding at 350° F. The procedure was to preheat the empty mold plates in the press for a few minutes, then the material was put in the mold and the mold containing the material was preheated in the press with the mold plates slightly open for two minutes. Then the mold plates were pressed closed under a force of about 20 tons for two minutes. The samples were cooled in the molds under pressure for two minutes. Microtensile pads having a thickness of about 0.6 mm and test regions measuring 2.54 mm in width and 12.7 mm in length were cut from the test pads with a die. The samples were stored in closed dry bottles for one or more days prior to tensile testing.

Tensile strengths of the samples were measured with an Instron TM table model instrument, using a pulling speed of 51 mm per minute. Measurements were made at room temperature (25° C.) and at several elevated temperatures. In the measurements at elevated temperature, after being placed in the testing oven, a 3 minute waiting period was allowed before pulling to enable the sample to equilibrate with the oven temperature.

The tensile properties for the 1-naphthaleneacetamide sample are presented in Table IV. For reference, tensile properties for the nonplasticized sulfonated EPDM gum are also given. These data show that the naphthaleneacetamide plasticized gum has excellent tensile strength. In particular, the high temperature tensile strength is exceptional for a sulfonated EPDM thermoplastic elastomer. For example, a sulfonated EPDM plasticized with stearic acid at roughly the same concentration has only about 60 psi tensile strength at 70° C., and most highly plasticized sulfonated EPDM's which have good melt rheology have tensile strengths at 100° C. of below 50 psi. In contrast, the 1-naphthaleneacetamide plasticized sample retains a tensile strength of well above 50 psi even at 120° C. The behavior for this thermoplastic elastomer is exceptional, especially considering its high melt flow rate at 190° C.

TABLE IV

Tensile Properties as a function of temperature for a Sulfonated EPDM* Plasticized with 1-Napthaleneacetamide

| Concentration of 1-Napthalene-acetamide (wt. %) | Temperature (°C.) | Tensile Properties | | |
|---|---|---|---|---|
| | | Maximum Strength (psi) | Initial Modulus (psi) | Elongation (%) |
| 0 | 25 | 650 | 385 | 250 |
| 17 | 25 | 2850 | 1520 | 490 |
| 0 | 70 | 305 | 310 | 310 |
| 17 | 70 | 650 | 930 | 560 |
| 17 | 100 | 120 | 535 | >900 |
| 17 | 120 | 85 | 420 | 600 |

*Zinc neutralized sulfonated EPDM, sulfonated to 32 meq./100g of gum.

EXAMPLE 4

MELT FLOW AND TENSILE PROPERTIES OF A SULFONATED EPDM PLASTICIZED WITH α OR β NAPHTHAMIDE

In this example the melt flow and high temperature tensile properties of two naphthalene amides are presented. In α and β naphthamide the carbon of the amide group is connected directly to the naphthalene ring structure, and they both have the formula $C_{11}H_9NO$, differing only in the position of connection of the amide group to the naphthalene ring. Melt flow rates, and tensile measurements at 120° C. are presented in Table V. It is seen that both of these naphthamides are good melt flow rate promoters, though, they are not quite as effective as the naphthaleneacetamide, especially at the highest concentrations. Also, both of these naphthamides have excellent tensile strengths at the elevated use temperature of 120° C. Tensile strengths at 120° C. were measured for these materials because of the difficulty in obtaining good high temperature tensile properties with these sulfonated thermoplastic elastomers. At lower use temperatures their tensile strengths would be considerably better. Overall, these naphthamides have an excellent balance of elevated temperature tensile strength and rheology at processing temperatures.

EPDM described in Example 1 except that the starting EPDM backbone polymer was different. The EPDM polymer used in this sulfonation was directly polymerized to a Mooney viscosity ML at 100° C. (1+8 min.) of about 20, and it had an ethylene content of about 56 wt. %. It was sulfonated to a level of about 32 meq. per 100 g of base polymer and was neutralized with 60 meq. of zinc acetate per 100 g of polymer. This nonplasticized sulfonated EPDM was too intractable to be practically fabricated by extrusion or injection molding. In fact, it had a melt flow rate which was substantially below that of the sulfonated EPDM prepared in Example 1. This nonplasticized sulfonated EPDM was combined with 1-naphthaleneacetamide using procedures similar to those of Example 2. Concentrations of about 7 and 17 wt. percent of the additive were produced. Melt flow rate and tensile measurements were made on these samples using the techniques and apparatus described in Example 3. The results are shown in Table IV. Tensile measurements were made at 100° C. and 120° C. because it is particularly difficult to achieve good tensile strength at these elevated temperatures with the thermoplastic elastomeric sulfonated EPDM's, and the naphthaleneacetamide was found to have excellent tensile strength at elevated use temperatures.

It is seen in Table IV that the sample containing 17 wt. % of naphthaleneacetamide has a melt flow rate which is a factor of 10 greater than the 7 wt. % sample. The high temperature tensile strengths of these materials are excellent as compared with other plasticizers giving flow rates in a similar range. For example; such plasticizers as stearic acid, octadecylamine, stearamide, stearanilide, and zinc stearate give far lower tensile strengths at 120° C. than the 1-naphthaleneacetamide samples presented here. Of particular importance in the data presented in Table IV is the change in tensile strength and modulus when the naphthalene amide additive is greatly increased in concentration from 7 wt. % to 17 wt. %. At both 100° C. and 120° C. it is seen that the increased concentration of plasticizer results in an increased tensile strength. This surprising result is contrary to the teachings of U.S. Pat. No. 3,847,854,

TABLE V

MELT FLOW AND TENSILE PROPERTIES OF A SULFONATED EPDM* PLASTICIZED WITH α OR β NAPHTHAMIDE

| Additive | Concentration (Wt. %) | Melt Flow Rate 190° C., 250 psi (g/10 min.) | Tensile Properties at 120° C. | | |
|---|---|---|---|---|---|
| | | | Maximum Strength (psi) | Initial Modulus (psi) | Elongation (%) |
| α-Naphthamide | 1.0 | 0.016 | | | |
| α-Naphthamide | 2.1 | 0.037 | | | |
| α-Naphthamide | 5.8 | 0.18 | | | |
| α-Naphthamide | 14 | 0.24 | 135 | 480 | 870 |
| β-Naphthamide | 1.0 | 0.013 | | | |
| β-Naphthamide | 2.3 | 0.041 | | | |
| β-Naphthamide | 6.2 | 0.13 | | | |
| β-Naphthamide | 14.4 | 0.34 | 80 | 340 | 800 |

*Zinc neutralized sulfonated EPDM, sulfonated to a level of 32 meq./100g of gum.

EXAMPLE 5

PHYSICAL PROPERTIES AS A FUNCTION OF CONCENTRATION FOR A NEUTRALIZED SULFONATED EPDM PLASTICIZED WITH 1-NAPHTHALENEACETAMIDE

The nonplasticized zinc neutralized lightly sulfonated EPDM employed in this example was prepared in a manner similar to the zinc neutralized sulfonated which limits the use of plasticizers to no more than 6-7 parts by weight because of adverse effects on the strength of the elastomer. Note that the increase in tensile strength which is shown in Table IV is accompanied by a large increase in melt flow rate (a factor of 10) so both tensile strength and melt flow rate are increased giving a large net improvement in the balance of tensile and melt flow properties; it is much more usual that an increase in tensile properties is offset by a reduced melt flow rate. In addition to the increase in the tensile strength with the increase in additive concentration to far above 7 wt. %, it is also seen that the modulus increases substantially. These results show that, unexpectedly, improvements in both tensile strength and melt flow rate can occur for naphthalene amides at high concentrations well above 7 wt. % of plasticizer.

TABLE IV

Melt Flow and Tensile Properties of a Napthaleneacetamide Plasticized Sulfonated EPDM at Different Concentrations

| Concentration of 1-Naphthaleneacetamide (wt.%) | Temperature (°C.) | Tensile Properties | | | Melt Flow Rate 190° C., 250 psi (g/10 min.) |
|---|---|---|---|---|---|
| | | Maximum Strength (psi) | Initial Modulus (psi) | Elongation (%) | |
| 7. | 100 | 135 | 360 | >800 | 0.13 |
| 17. | 100 | 145 | 745 | >800 | 1.3 |
| 7. | 120 | 75 | 230 | 450 | 0.13 |
| 17. | 120 | 80 | 460 | 245 | 1.3 |

TABLE V

Melt Flow Rate of a Sodium Neutralized Sulfonated EPDM As a Function of Concentration of 1-Naphthaleneacetamide

| Wt. Percent of 1-Naphthaleneacetamide | Melt Flow Rate 190° C., 250 psi (g/10 min.) |
|---|---|
| 0 | <0.00002 |
| 2.0 | 0.0044 |
| 3.7 | 0.014 |
| 5.9 | 0.063 |
| 8.5 | 0.39 |

EXAMPLE 6

MELT FLOW RATES OF A SODIUM NEUTRALIZED SULFONATED EPDM PLASTICIZED WITH 1-NAPHTHALENEACETAMIDE

The nonplasticized sodium neutralized lightly sulfonated EPDM utilized in this example was prepared in a manner similar to the zinc neutralized sulfonated EPDM described in Example 5 except that 60 meq. of sodium acetate per 100 g of polymer was used for neutralization instead of the zinc acetate. As in Example 5, the starting backbone polymer was the directly polymerized EPDM. This nonplasticized sodium neutralized sulfonated EPDM was extremely tough even at 200° C.; it was far tougher than the zinc neutralized sulfonated EPDM described in Example 5, and it was too intractable to be fabricated by extrusion or injection molding. Its melt flow rate at 190° C. and 250 psi load was too low to be measured (less than 0.00002 g/10 min).

1-Naphthaleneacetamide was added to the sodium neutralized sulfonated EPDM in a Brabender Platicorder using the procedure described in Example 2, and samples having a range of different concentrations of the additive were prepared. At the lowest concentration of 1-naphthaleneacetamide shown, 2.0 wt. %, the mix did not fuse into a melt, but remained a powder. However, after the second addition of the plasticizer to make a concentration of 3.7 wt. %, the mix fluxed forming a fused but chunky mass in the Brabender mixer.

Melt flow rates were measured on these materials using the procedure described in Example 3; the results are shown in Table V. At the lowest concentration of 2 wt. %, the melt flow rate is quite slow—only about 0.004 g/10 min. However, this was over 100 times the melt flow rate of the nonplasticized sodium neutralized sulfonated EPDM. As the concentration of this naphthaleneamide was increased it is seen in Table V that the melt flow rate of the plasticized gum increased rapidly until at a concentration of 8.5 wt. % the melt flow rate is almost 0.4 g/10 min. These results show that 1-naphthaleneacetamide is an effective melt flow promoter for a sodium neutralized sulfonated EPDM. Utilization of this naphthaleneamide converted the sodium neutralized sulfonated EPDM from an intractable material to a processable thermoplastic elastomer.

EXAMPLE 7

COMPARISON OF PROPERTIES OF SULFONATED EPDM GUMS PLASTICIZED WITH HIGH CONCENTRATIONS OF ADDITIVES HAVING VARIOUS FUNCTIONAL GROUPS

Samples of the nonplasticized gum described in Example 1 were mixed with high concentrations of additives having various different functional groups. Melt flow rate and room temperature tensile measurements were made on each sample. The results are shown in Table VI; the functional groups in this Table include amide, ester, ketone, phthalate, alcohol, and nitrile as well as a $C_{18}$ wax and a nonplasticized sample for reference. Techniques similar to those described in Example 2 were used for incorporating the additives into the nonplasticized gum. The mixes which resulted in very low melt flow rate compositions (see Table VI) were difficult to mix and required longer times (perhaps 10 minutes or slightly longer) in the Brabender mixer. Also, these low melt flow rate compositions tended to mix as chunks rather than forming a coherent sheet or melt within the mixer. For example, the nitrile and ketone plasticized samples were particularly difficult to mix. However, it appeared that adequate dispersion of the additive in each of the samples was accomplished, and the material removed from the mixer appeared to be uniform in all cases.

The six additives with functional groups shown here all have dipole moments well above 0.6 Debyes, so the value of the dipole moment does not distinguish between which will be the more effective additives; yet, when used at roughly comparable wt. percent concentrations there is an enormous difference between the melt flow rates of the various additives shown here. The naphthaleneamide is not only outstanding in its melt flow rate, but it is also clearly excellent in its tensile strength.

These results show that numerous organic chemicals having high dipole moments are relatively poor as melt flow improvers when used at high concentrations in a sulfonated elastomer. Naphthalene amides stand out as very effective additives for sulfonated EPDM at high concentration, and their excellent effectiveness as compared with many other functional additives could not be anticipated from the prior art.

TABLE VI
COMPARISON OF VARIOUS FUNCTIONAL TYPES AS ADDITIVES TO A ZINC NEUTRALIZED SULFONATED EPDM

| Additive | Concentration Wt. % | Melt Flow Rate[1] (g/10 min) | Tensile Properties[2] Room Temperature | | |
|---|---|---|---|---|---|
| | | | Strength (psi) | Elong. (%) | Initial Modulus[3] (psi) |
| 1-Naphthaleneacetamide | 17.0 | 1.3 | 2850 | 490 | 1520 |
| Butylstearate | 17.0 | 0.10 | 670 | 480 | 300 |
| 6-undecanone | 9.3 | 0.02 | 620 | 310 | 395 |
| Didodecyl phthalate | 23.1 | 0.15 | 555 | 425 | 265 |
| Octadecylalcohol | 13.9 | 0.36 | 1300 | 490 | 475 |
| Stearonitrile | 13.7 | 0.15 | 770 | 495 | 370 |
| Octadecane | 13.3 | 0.19 | 720 | 410 | 375 |
| None | — | 0.007 | 650 | 250 | 385 |

[1]ASTM 1238-70, Standard Capillary, 190° C., 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.

What is claimed is:

1. An elastomeric composition including:
   (a) a neutralized sulfonated elastomeric polymer having about 15 to about 50 meq. sulfonate groups per 100 grams of said neutralized sulfonated elastomeric polymer, said sulfonate groups having metal cations; and
   (b) at least 8 parts by weight of an aromatic organic amide per 100 parts by weight of said neutralized sulfonated elastomeric polymer, said organic amide having a formula selected from the group consisting of:

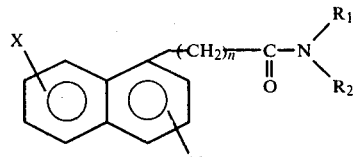

or

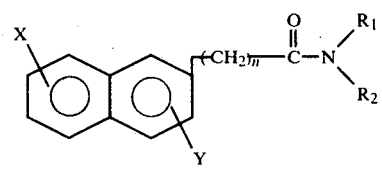

wherein n equals 0, 1, 2, 3, or 4, $R_1$ and $R_2$ are independently selected from the group consisting of hydrogen, and $C_1$ to $C_4$ straight and branched chain alkyl groups, wherein X and Y are independently selected from the groups consisting of hydrogen, $C_1$ to $C_4$ straight and branched chain alkyl groups.

2. A composition according to claim 1, wherein said neutralized sulfonated elastomeric polymer is formed from an elastomeric polymer selected from the group consisting of Butyl rubber and an EPDM terpolymer.

3. A composition according to claim 2 wherein said EPDM terpolymer has a Mooney viscosity (M.L. 1+8, 212° F.) of about 5 to about 60.

4. A composition according to claim 1, wherein said metal cation of said metal neutralized sulfonated polymer is selected from the group consisting of Groups I-A, II-A, I-B, II-B, lead antimony and iron of the Periodic Table of Elements.

5. A composition according to claim 1, wherein said amide is naphthalene acetamide.

6. A composition according to claim 1, wherein said amide is α-naphthamide or β-naphthamide.

7. A composition according to claim 1, containing at least 10 parts by weight of said amide per 100 parts of such neutralized sulfonated elastomeric polymer.

8. A composition according to claim 1, wherein said metal cation is zinc or sodium.

9. A composition according to claim 1, further including at least one additive selected from the group consisting of inorganic fillers, reinforcing agents, polyolefinic thermoplastic resins, waxes, and non-polar process oils and mixtures thereof.

10. An elastomeric article formed from an elastomeric blend composition comprising:
    (a) a neutralized sulfonated elastomeric polymer having about 15 to about 50 meq. sulfonate groups per 100 grams of said neutralized sulfonated elastomeric polymer, said sulfonate groups having metal cations; and
    (b) at least 8 parts by weight of an aromatic organic amide per 100 parts of said neutralized sulfonated elastomeric polymer, said organic amide having a formula selected from the group consisting of:

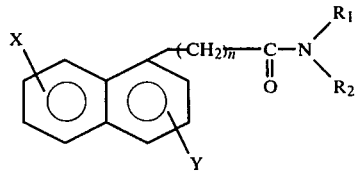

or

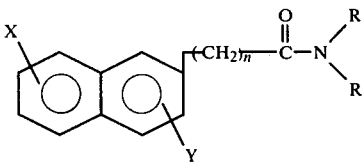

wherein n equals 0, 1, 2, 3, or 4, $R_1$ and $R_2$ are independently selected from the group consisting of hydrogen, and $C_1$ to $C_4$ straight and branched chain alkyl groups, wherein X and Y are independently selected from the groups consisting of hydrogen, $C_1$ to $C_4$ straight and branched chain alkyl groups.

11. An elastomeric article according to claim 10, wherein said neutralized sulfonated elastomeric polymer is formed from an elastomeric polymer selected from the group consisting of Butyl rubber and an EPDM terpolymer.

12. An elastomeric article according to claim 11 wherein said EPDM terpolymer has a Mooney viscosity (M. L. 1+8, 212° F.) of about 5 to about 60.

13. An elastomeric article according to claim 10, wherein said metal cation of said metal neutralized sulfonated polymer is selected from the group consisting of Groups I-A, II-A, I-B, II-B, lead, antimony and iron of the Periodic Table of Elements.

14. An elastomeric article according to claim 10, wherein said amide is naphthlene acetamide.

15. An elastomeric article according to claim 10, wherein said amide is α-naphthamide or β-naphthamide.

16. An elastomeric article according to claim 10, containing at least 10 parts by weight of said amide per 100 parts of such neutralized sulfonated elastomeric polymer.

17. An elastomeric article according to claim 10, wherein said metal cation is zinc or sodium.

18. An elastomeric article according to claim 10, further including at least one additive selected from the group consisting of inorganic fillers, reinforcing agents, polyolefinic thermoplastic resins, waxes, and non-polar process oils and mixtures thereof.

* * * * *